(12) United States Patent
Takai et al.

(10) Patent No.: US 9,181,991 B2
(45) Date of Patent: Nov. 10, 2015

(54) DRIVING FORCE TRANSMISSION APPARATUS

(71) Applicant: JTEKT CORPORATION, Osaka-shi (JP)

(72) Inventors: Tomoyoshi Takai, Kariya (JP); Hiroshi Takuno, Nukata-gun (JP); Kunihiko Suzuki, Gamagori (JP)

(73) Assignee: JTEKT CORPORATION, Osaka-shi (JP)

( * ) Notice: Subject to any disclaimer, the term of this patent is extended or adjusted under 35 U.S.C. 154(b) by 243 days.

(21) Appl. No.: 13/864,417

(22) Filed: Apr. 17, 2013

(65) Prior Publication Data
US 2013/0277167 A1  Oct. 24, 2013

(30) Foreign Application Priority Data
Apr. 24, 2012  (JP) .................. 2012-098753

(51) Int. Cl.
*F16D 25/08* (2006.01)
*F16D 25/06* (2006.01)
*F16D 25/12* (2006.01)
F16D 48/02 (2006.01)

(52) U.S. Cl.
CPC .............. *F16D 25/06* (2013.01); *F16D 25/082* (2013.01); *F16D 25/123* (2013.01); *F16D 2048/029* (2013.01)

(58) Field of Classification Search
CPC ................................. F16D 2048/029
USPC ............ 192/85.27, 85.29, 85.3, 85.33, 85.31, 192/85.44, 52.5
See application file for complete search history.

(56) References Cited

U.S. PATENT DOCUMENTS 2,702,618 A * 2/1955 Baker et al. .................. 192/85.3
2,775,331 A * 12/1956 Peterson ................... 192/113.36
2,869,701 A * 1/1959 Yokel ......................... 192/85.41
3,202,253 A * 8/1965 Bolster et al. ............ 192/113.36

FOREIGN PATENT DOCUMENTS

JP  2008-121796  5/2008

* cited by examiner

*Primary Examiner* — Robert Hodge
*Assistant Examiner* — Ryan Dodd
(74) *Attorney, Agent, or Firm* — Oblon, McClelland, Maier & Neustadt, L.L.P.

(57) ABSTRACT

In a driving force transmission apparatus, an oil inlet portion for introducing hydraulic fluid from one of spaces to the other one of the spaces is formed, and an apparatus case has an oil outlet portion for delivering the hydraulic fluid from the other one of the spaces to an outside of the other one of the spaces with an oil delivery capacity lower than an oil introducing capacity of the oil inlet portion. A pressure regulation valve for bringing the oil inlet portion into an open state upon reception of hydraulic pressure higher than or equal to a predetermined pressure from hydraulic fluid is arranged at the oil inlet portion.

20 Claims, 4 Drawing Sheets

FIRST EMBODIMENT OF THE INVENTION

FIRST EMBODIMENT OF THE INVENTION

DRIVING FORCE TRANSMISSION APPARATUS

INCORPORATION BY REFERENCE

The disclosure of Japanese Patent Application No. 2012-098753 filed on Apr. 24, 2012 including the specification, drawings and abstract, is incorporated herein by reference in its entirety.

BACKGROUND OF THE INVENTION

1. Field of the Invention

The invention relates to a driving force transmission apparatus that transmits driving force from an input shaft to an output shaft in, for example, an automobile.

2. Description of the Related Art

There is a conventional driving force transmission apparatus that is mounted in, for example, a four-wheel-drive vehicle and in which a pair of rotary members are coupled to each other by a clutch such that torque is transmittable therebetween (see, for example, Japanese Patent Application Publication No. 2008-121796 (JP 2008-121796 A)).

The driving force transmission apparatus is formed of a first rotary member, a second rotary member, a friction clutch and a pressing force application mechanism. The first rotary member rotates together with an input shaft. The second rotary member is rotatable about the axis of the first rotary member. The clutch couples the second rotary member and the first rotary member to each other such that torque is transmittable therebetween. The pressing force application mechanism applies pressing force, which is used as clutch actuating force, to the clutch.

The first rotary member is formed of a closed-end cylindrical housing that is open toward one side. The first rotary member is coupled to the input shaft. The first rotary member rotates upon reception of the driving force from a driving source, such as a vehicle engine, via the input shaft.

The second rotary member is arranged so as to be rotatable relative to the first rotary member, and is coupled to an output shaft. The second rotary member is accommodated in an apparatus case together with the first rotary member.

The clutch includes inner clutch plates and outer clutch plates, and is arranged between the first rotary member and the second rotary member. The clutch couples the first rotary member and the second rotary member to each other such that torque is transmittable therebetween, by frictionally engaging the inner clutch plates and the outer clutch plates with each other.

The pressing force application mechanism includes a piston and a pressing force application member. The piston is movable back and forth inside the apparatus case (cylinder). The pressing force application member applies the moving force of the piston as pressing force, to the clutch. The pressing force application mechanism is arranged on the input side of the clutch.

With the above-described configuration, when driving force from the engine is input into the first rotary member via the input shaft, the first rotary member rotates about its axis. At this time, if hydraulic fluid is supplied into the cylinder, pressure due to the hydraulic fluid acts on the piston.

Therefore, the pressing force application mechanism is actuated, the piston moves toward the clutch accordingly, and the moving force is applied from the pressing force application member to the clutch as pressing force.

Then, the inner clutch plates and the outer clutch plates of the clutch approach each other and then frictionally engage with each other, and the first rotary member and the second rotary member are coupled to each other due to the frictional engagement such that torque is transmittable therebetween. Thus, the driving force from the engine is transmitted from the input shaft to the output shaft via the driving force transmission apparatus.

With the driving force transmission apparatus described in JP 2008-121796 A, it is desirable to reduce the amount of lubricating oil (to lower the oil level) in the housing in order to reduce adverse influence due to so-called drag torque that is generated on the basis of the viscosity of the lubricating oil while the four-wheel-drive vehicle travels in a two-wheel-drive mode.

On the other hand, if the amount of lubricating oil in the housing is excessively small while the four-wheel-drive vehicle travels in a four-wheel-drive mode, there is a possibility that the clutch plates may be damaged due to heat of the clutch plates, which is generated through frictional engagement between the inner clutch plates and the outer clutch plates of the clutch, and the durability of the clutch may decrease.

SUMMARY OF THE INVENTION

It is an object of the invention to provide a driving force transmission apparatus configured to keep the oil level of lubricating oil in an apparatus case at a desired oil level to reduce drag torque and to suppress a decrease in the durability of a clutch.

An aspect of the invention relates to a driving force transmission apparatus, including: a first rotary member that is rotated by a driving source of a vehicle; a second rotary member that is arranged on a rotation axis of the first rotary member so as to be rotatable relative to the first rotary member; a clutch that is interposed between the second rotary member and the first rotary member, and that couples the first rotary member and the second rotary member to each other such that the first rotary member and the second rotary member are disengageable from each other; a pressing force application mechanism that includes a piston that applies pressing force to the clutch through movement due to supplied hydraulic fluid; and an apparatus case that has two spaces that are adjacent to each other via the piston of the pressing force application mechanism. An oil inlet portion for introducing the hydraulic fluid from the oil supply-side space among the two spaces to the clutch-side space among the two spaces is formed. The apparatus case has an oil outlet portion for delivering the hydraulic fluid from the clutch-side space to an outside of the clutch-side space with an oil delivery capacity lower than an oil introducing capacity of the oil inlet portion. A pressure regulation valve that brings the oil inlet portion into an open state upon reception of a hydraulic pressure higher than or equal to a predetermined pressure from the hydraulic oil is arranged at the oil inlet portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
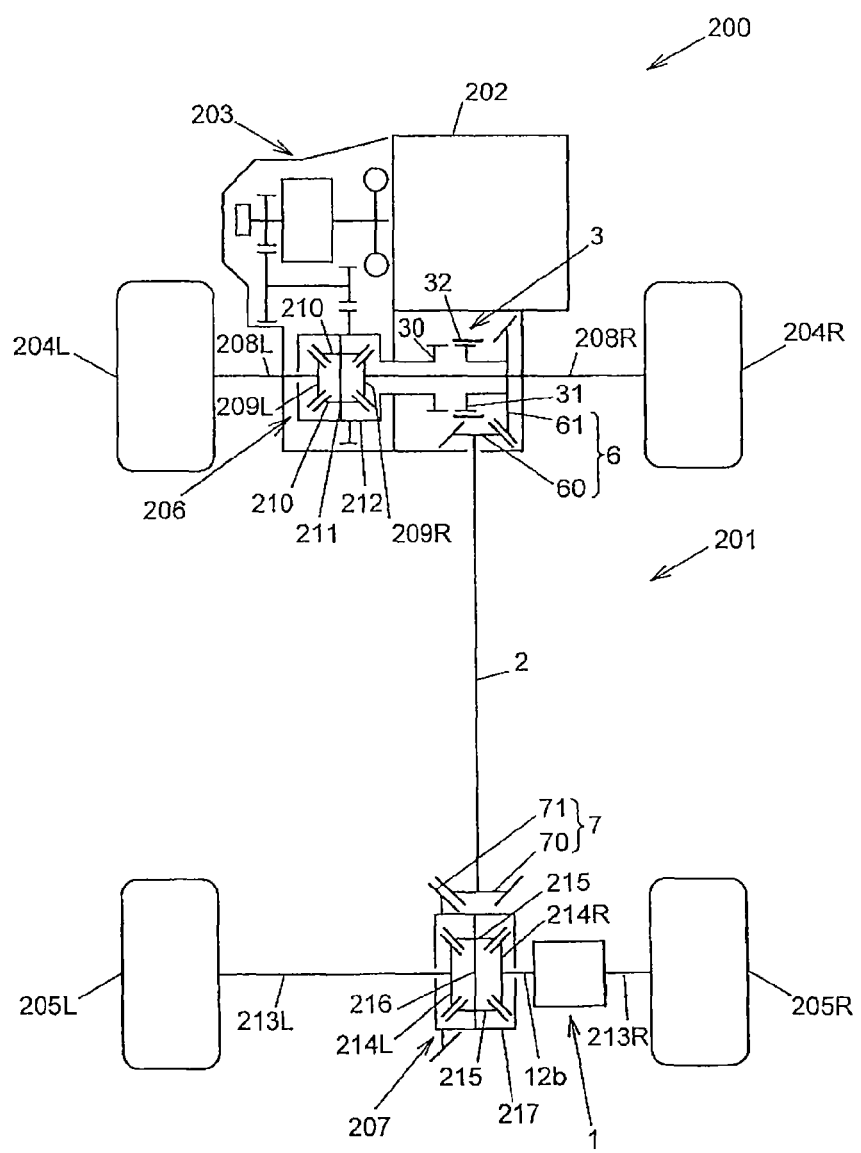
FIG. 1 is a plan view for schematically illustrating a vehicle in which a driving force transmission apparatus according to a first embodiment of the invention is mounted.

FIG. 1 schematically shows a four-wheel-drive vehicle 200. As shown in FIG. 1, the four-wheel-drive vehicle 200 includes a driving force transmission system 201, an engine 202, a transmission 203, front wheels 204R, 204L that serve as main drive wheels, and rear wheels 205R, 205L that serve as auxiliary drive wheels.

The driving force transmission system 201 is arranged on a driving force transmission path that extends from the transmission 203 to the rear wheels 205R, 205L in the four-wheel-drive vehicle 200, together with a front differential 206 and a rear differential 207. The driving force transmission system 201 is mounted on a vehicle body (not shown) of the four-wheel-drive vehicle 200.

The driving force transmission system 201 includes a driving force transmission apparatus 1, a propeller shaft 2 and a driving force interrupting device 3. The driving force transmission system 201 is configured to be able to shift the four-wheel-drive vehicle 200 from a four-wheel-drive mode to a two-wheel-drive mode or from the two-wheel-drive mode to the four-wheel-drive mode. The details of the driving force transmission apparatus 1 will be described later.

The front differential 206 includes side gears 209R, 209L, a pair of pinion gears 210, a gear support member 211 and a front differential case 212. The front differential 206 is arranged between the transmission 203 and the driving force interrupting device 3. The side gear 209L is coupled to a front wheel axle shaft 208L, and the side gear 209R is coupled to a front wheel axle shaft 208R. The pinion gears 210 are arranged such that the gear axes thereof are perpendicular to the gear axes of the side gears 209R, 209L, and are in mesh with the side gears 209R, 209L. The gear support member 211 supports the pinion gears 210 such that the pinion gears 210 are rotatable. The front differential case 212 accommodates the gear support member 211, the pinion gears 210 and the side gears 209R, 209L.

The rear differential 207 includes side gears 214R, 214L, a pair of pinion gears 215, a gear support member 216 and a rear differential case 217. The rear differential 207 is arranged between the propeller shaft 2 and the driving force transmission apparatus 1. The side gear 214L is coupled to a rear wheel axle shaft 213L, and the side gear 214R is coupled to a rear wheel axle shaft 213R. The pinion gears 215 are arranged such that the gear axes thereof are perpendicular to the gear axes of the side gears 214R, 214L, and are in mesh with the side gears 214R, 214L. The gear support member 216 supports the pinion gears 215 such that the pinion gears 215 are rotatable. The rear differential case 217 accommodates the gear support member 216, the pinion gears 215 and the side gears 214R, 214L.

The engine 202 drives the front wheels 204R, 204L by outputting driving force to the front wheel axle shafts 208R, 208L via the transmission 203 and the front differential 206.

The engine 202 drives the rear wheel 205L by outputting driving force to the rear wheel axle shaft 213L via the transmission 203, the driving force interrupting device 3, the propeller shaft 2 and the rear differential 207. The engine 202 drives the rear wheel 205R by outputting driving force to the rear wheel axle shaft 213R via the transmission 203, the driving force interrupting device 3, the propeller shaft 2, the rear differential 207 and the driving force transmission apparatus 1.

The propeller shaft 2 is arranged between the driving force transmission apparatus 1 and the driving force interrupting device 3. The propeller shaft 2 receives the driving force of the engine 202 from the front differential case 212, and then transmits the driving force from the front wheels 204R, 204L side toward the rear wheels 205R, 205L.

A front wheel gear mechanism 6 is arranged at the front wheel-side end portion of the propeller shaft 2. The front wheel gear mechanism 6 is formed of a drive pinion 60 and a ring gear 61 that are in mesh with each other. A rear wheel gear mechanism 7 is arranged at the rear wheel-side end portion of the propeller shaft 2. The rear wheel gear mechanism 7 is formed of a drive pinion 70 and a ring gear 71 that are in mesh with each other.

The driving force interrupting device 3 is formed of a dog clutch that includes a first spline tooth portion 30, a second spline tooth portion 31 and a sleeve 32. The first spline tooth portion 30 is non-rotatable with respect to the front differential case 212. The second spline tooth portion 31 is non-rotatable with respect to the ring gear 61. The dog clutch has the sleeve 32 that is able to be spline-fitted to the first spline tooth portion 30 and the second spline tooth portion 31. The driving force interrupting device 3 is arranged at the front wheels 204R, 204L side of the four-wheel-drive vehicle 200. The driving force interrupting device 3 is connected to a vehicle electronic control unit (ECU) (not shown) via an actuator (not shown). The driving force interrupting device 3 couples the propeller shaft 2 and the front differential case 212 to each other such that the propeller shaft 2 and the front differential case 212 are disengageable from each other.

Figure 2:
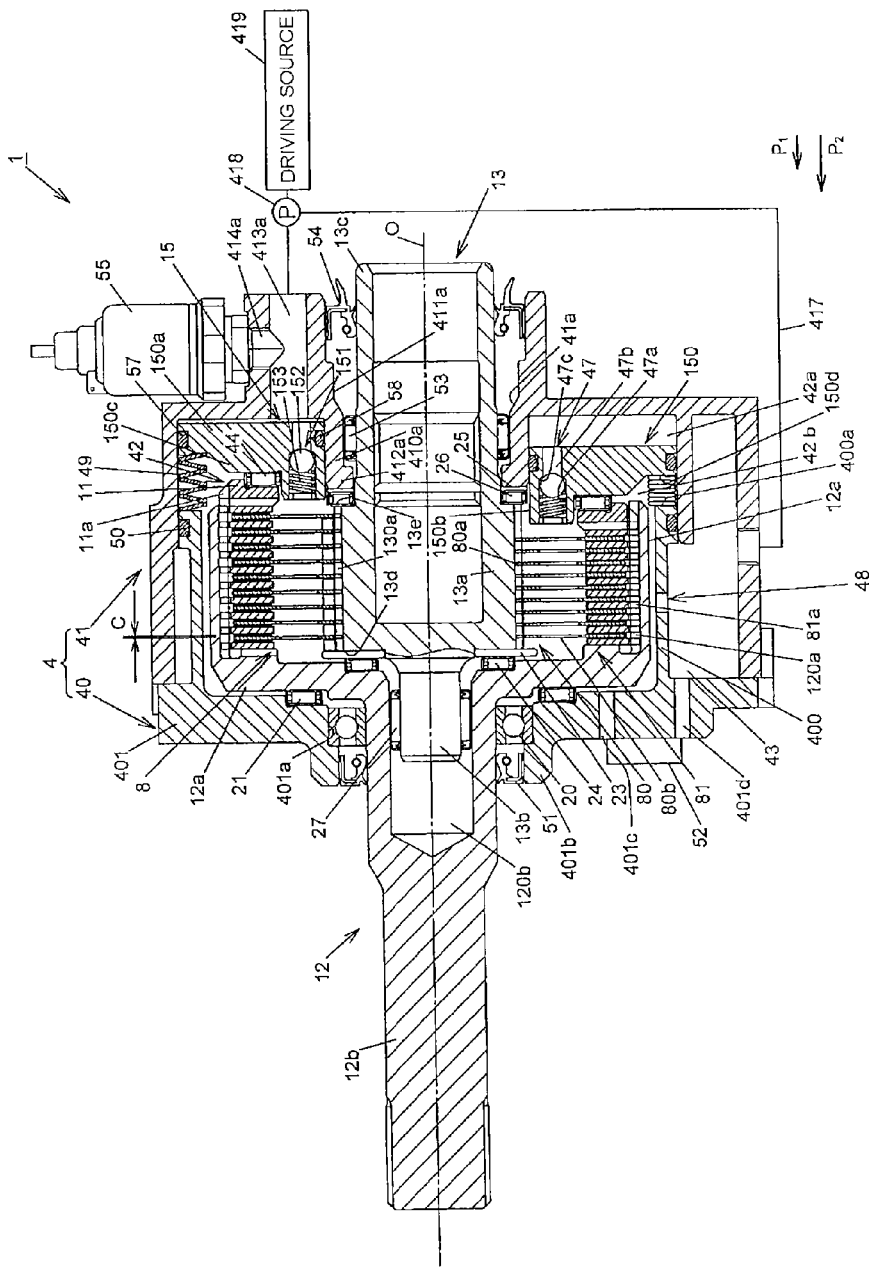
FIG. 2 is a sectional view for illustrating the entirety of the driving force transmission apparatus according to the first embodiment of the invention, wherein the upper half shows a disconnected state and the lower half shows a connected state.

FIG. 2 shows the driving force transmission apparatus. As shown in FIG. 2, the driving force transmission apparatus 1 includes an apparatus case 4, a clutch (multiple disk clutch) 8, a housing 12, an inner shaft 13 and a pressing force application mechanism 15. The driving force transmission apparatus 1 is arranged at the rear wheel 205R (shown in FIG. 1) side of the four-wheel-drive vehicle 200 (shown in FIG. 1).

The driving force transmission apparatus 1 couples the propeller shaft 2 (shown in FIG. 1) and the rear wheel axle shaft 213R (shown in FIG. 1) to each other such that the propeller shaft 2 and the rear wheel axle shaft 213R are disengageable from each other. That is, the rear wheel axle shaft 213R and the propeller shaft 2 are coupled to each other via the driving force transmission apparatus 1. The rear wheel axle shaft 213L (shown in FIG. 1) and the propeller shaft 2 are coupled to each other without providing the driving force transmission apparatus 1 therebetween.

Thus, when the rear wheel axle shaft 213R is coupled to the propeller shaft 2 by the driving force transmission apparatus 1, the rear wheel axle shaft 213L and the propeller shaft 2 are coupled to each other via the gear mechanism 7 and the rear differential 207 (both are shown in FIG. 1) such that torque is transmittable therebetween, and the rear wheel axle shaft 213R and the propeller shaft 2 are coupled to each other via the gear mechanism 7 and the rear differential 207 such that torque is transmittable therebetween. On the other hand, when the rear wheel axle shaft 213R is disconnected from the propeller shaft 2 by the driving force transmission apparatus 1, the left rear wheel axle shaft 213L remains coupled to the propeller shaft 2 via the gear mechanism 7 and the rear differential 207, whereas the right rear wheel axle shaft 213R is disconnected from the propeller shaft 2.

The apparatus case 4 is formed of two cases 40, 41 that are arranged next to each other along a rotation axis O. The apparatus case 4 is fitted to the vehicle body (not shown) of the four-wheel-drive vehicle 200 (shown in FIG. 1). Two spaces 42a, 42b are formed in the apparatus case 4. The spaces 42a, 42b are located next to each other via a piston 150 (described later) of the pressing force application mechanism 15. The space 42a functions as a fluid supply-side space (cylinder), and the space 42b functions as a clutch-side space. Oil inlet portions 47 and an oil outlet portion 48 are arranged in the apparatus case 4. The oil inlet portions 47 are used to introduce hydraulic fluid (lubricating oil) from the space 42a into the space 42b. The oil outlet portion 48 is used to deliver the lubricating oil from the space 42b to the outside. The details of the oil inlet portions 47 will be described later (described in association with the pressing force application mechanism 15).

The oil outlet portion 48 is an oil flow passage formed of a through-hole (round hole) that is communicated (connected) with an oil tank 43 and the space 42b. The oil outlet portion 48 is formed in a body portion 400 (described later) of the case 40. Through the oil outlet portion 48, the lubricating oil flows from the space 42b to the oil tank 43.

The case 40 has the body portion 400 and a bottom portion 401. The entirety of the case 40 is formed of a closed-end cylindrical member that is open toward the case 41 (right side in FIG. 2).

The body portion 400 is open toward both sides in the rotation axis O. The entirety of the body portion 400 is formed of an open-end cylindrical member that accommodates part of the housing 12. A piston 150-side open end face of the body portion 400 is formed of a spring receiving face 400a that receives the spring force of a return spring 49. The oil tank 43 is formed on the radially outer side of the body portion 400. The lubricating oil is stored in a space between the outer periphery of the body portion 400 and the inner periphery of the case 41. A seal member 50 is attached to the piston 150-side open end portion of the body portion 400. The seal member 50 is interposed between the outer periphery of the body portion 400 and the inner periphery of the case 41, and seals the oil tank 43.

The bottom portion 401 faces the piston 150 via the clutch 8, and the like, and the entirety of the bottom portion 401 is formed of an annular member that closes an opening portion of the body portion 400, which is on the side opposite to a piston 150-side opening portion. The bottom portion 401 forms the oil tank 43 together with the body portion 400 and the case 41. The bottom portion 401 has an insertion hole 401a through which the housing 12 is passed along the rotation axis O. A cylindrical portion 401b is formed at the outer opening periphery of the insertion hole 401a. The cylindrical portion 401b protrudes toward the rear differential 207 (shown in FIG. 1), and has a central axis that coincides with the rotation axis O. A seal mechanism 51 is attached to the cylindrical portion 401b. The seal mechanism 51 is interposed between the inner periphery of the cylindrical portion 401b and the outer periphery of the inner shaft 13. In addition, the bottom portion 401 has a first oil flow hole 401c and a second oil flow hole 401d. The first oil flow hole 401c communicates with the space 42b, and is used to determine the upper limit height of the oil level (oil height) of lubricating oil in the space 42b. The second oil flow hole 401d communicates with the oil tank 43. The first oil flow hole 401c and the second oil flow hole 401d are connected to each other by a pipe 52.

The case 41 has an insertion hole 41a through which the inner shaft 13 (described later) is passed along the rotation axis O, and the entirety of the case 41 is formed of a closed-end cylindrical member that is open toward the case 40 (left side in FIG. 2). A cylindrical portion 410a is formed at the inner opening periphery of the insertion hole 41a. The cylindrical portion 410a protrudes toward the clutch 8, and has a central axis that coincides with the rotation axis O. A cylindrical portion 411a is formed at the outer opening periphery of the insertion hole 41a. The cylindrical portion 411a protrudes in a direction opposite to the direction in which the cylindrical portion 410a protrudes, and has a central axis that coincides with the rotation axis O.

An annular inner flange 412a is formed at a clutch 8-side end portion of the cylindrical portion 410a. The inner flange 412a protrudes from the inner periphery of the cylindrical portion 410a. A needle roller bearing 53 is fitted to the cylindrical portion 410a. The needle roller bearing 53 is interposed between the inner periphery of the cylindrical portion 410a and the outer periphery of the inner shaft 13, and arranged on the opposite side of the inner flange 412a from the clutch 8.

A seal mechanism 54 is attached to the cylindrical portion 411a. The seal mechanism 54 is interposed between the inner periphery of the cylindrical portion 411a and the outer periphery of the inner shaft 13. A piping portion 413a is provided on the outer periphery of the cylindrical portion 411a. The piping portion 413a communicates with the space 42a, and communicates with the oil tank 43 via an oil flow passage 417. The piping portion 413a has a sensor fitting hole 414a that communicates with the inside of the piping portion 413a. A pressure sensor 55 is fitted in the sensor fitting hole 414a.

A pump 418 is arranged on the oil flow passage 417. The pump 418 is used to deliver lubricating oil from the oil tank 43 to the space 42a via the piping portion 413a and to discharge the lubricating oil from the space 42a to the oil tank 43. The pump 418 is, for example, a trochoid pump, and is connected to a driving source 419. When the pump 418 is driven in the forward direction by the driving source 419, the lubricating oil is delivered from the oil tank 43 to the space 42a via the oil flow passage 417, the piping portion 413a, and the like. When the pump 418 is driven in the reverse direction by the driving source 419, the lubricating oil is discharged from the space 42a to the oil tank 43 via the piping portion 413a, the oil flow passage 417, and the like.

The clutch 8 is formed of a friction clutch that includes a plurality of inner clutch plates 80 and a plurality of outer clutch plates 81. The clutch 8 is arranged between the housing 12 that may function as a first rotary member and the inner shaft 13 that may function as a second rotary member.

Any adjacent inner and outer clutch plates among the inner clutch plates 80 and the outer clutch plates 81 of the clutch 8 may be frictionally engaged with each other. Also, the frictional engagement between the inner clutch plates 80 and the outer clutch plates 81 of the clutch 8 may be cancelled. In this way, the clutch 8 couples the housing 12 and the inner shaft 13 to each other such that the housing 12 and the inner shaft 13 are disengageable from each other.

The inner clutch plates 80 and the outer clutch plates 81 are alternately arranged along the rotation axis O, and each are entirely formed of an annular friction plate. A clearance C between any adjacent two clutch plates among the inner clutch plates 80 and the outer clutch plates 81 is set to such a value that the clutch plates do not frictionally engage with each other due to drag torque based on the viscosity of lubricating oil when the four-wheel-drive vehicle 200 (shown in FIG. 1) travels in the two-wheel-drive mode.

Each of the inner clutch plates 80 has a straight spline fitting portion 80a at its inner peripheral portion. The straight spline fitting portions 80a of the inner clutch plates 80 are fitted to a straight spline fitting portion 130a of the cylindrical portion 13a (inner shaft 13). Thus, the inner clutch plates 80 are connected to the inner shaft 13 so as to be non-rotatable but movable relative to the inner shaft 13.

A plurality of oil holes 80b is formed in each of the inner clutch plates 80. The oil holes 80b are arranged in the circumferential direction of the inner clutch plates 80, and are open toward both sides in the rotation axis O.

Each of the outer clutch plates 81 has a straight spline fitting portion 81a at its outer peripheral portion. The outer clutch plates 81 are coupled to the housing 12 by fitting the straight spline fitting portions 81a to a straight spline fitting portion 120a (described later) of the cylindrical portion 12a (housing 12). Thus, the outer clutch plates 81 are connected to the housing 12 so as to be non-rotatable but movable relative to the housing 12.

Among the outer clutch plates 81, the outer clutch plate closest to the piston 150 functions as an input portion of the clutch 8. When the outer clutch plate closest to the piston 150 receives a first pressing force P1 that is directed from the piston 150 of the pressing force application mechanism 15 toward the clutch 8 via a pressing member 11, the clearance C between any adjacent two of the inner clutch plates 80 and the outer clutch plates 81 is reduced to, for example, 0 (C=0) due to the movement in the pressing direction. When the outer clutch plate closest to the piston 150 among the outer clutch plates 81 receives a second pressing force P2 (P2≥P1) that is directed from the piston 150 of the pressing force application mechanism 15 toward the clutch 8 via the pressing member 11 after application of the first pressing force P1, any adjacent two of the inner clutch plates 80 and the outer clutch plates 81 frictionally engage with each other due to the movement in the pressing direction.

The pressing member 11 has a straight spline fitting portion 11a that is exposed to the space 42b of the apparatus case 4, and the entirety of the pressing member 11 is formed of an annular member. The pressing member 11 is coupled to the housing 12 by fitting the straight spline fitting portion 11a to the straight spline fitting portion 120a of the cylindrical portion 12a, on the clutch 8 side of the pressing force application mechanism 15. Thus, the pressing member 11 is connected to the housing 12 so as to be non-rotatable but movable relative to the housing 12. The pressing member 11 is rotatably supported by the piston 150 of the pressing force application mechanism 15 via a needle roller bearing 44.

Figure 3:
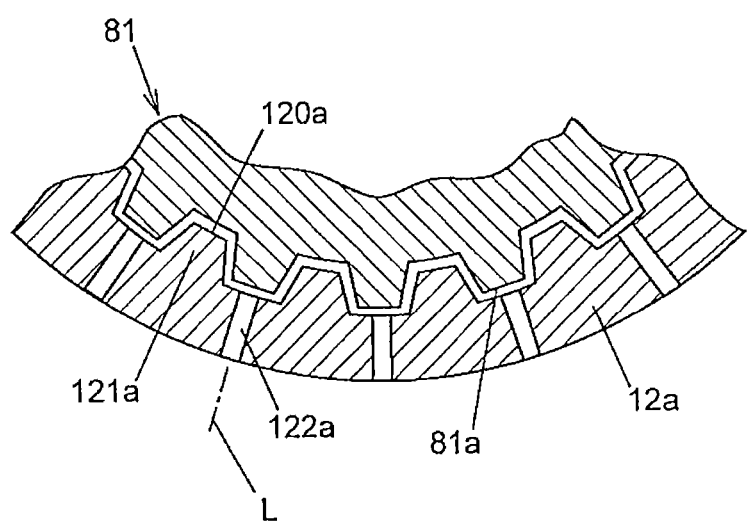
FIG. 3 is a sectional view that shows a state where a second rotary member is fitted to clutch plates of a clutch in the driving force transmission apparatus according to the first embodiment of the invention.

FIG. 3 shows a state where the housing is splined-fitted to the outer clutch plates. As shown in FIG. 2, the housing 12 has the cylindrical portion 12a and a shaft portion 12b, and is arranged on the axis (rotation axis O) of the rear wheel axle shaft 213R (shown in FIG. 1). The housing 12 is rotatably supported by the inner periphery of the case 40, which defines the insertion hole 401a, via a ball bearing 20. The bottom portion of the cylindrical portion 12a of the housing 12 is rotatably supported by the bottom portion 401 of the case 40 via a needle roller bearing 21.

The cylindrical portion 12a is open toward the space 42b of the apparatus case 4, and is arranged at one-side end portion (right-side end portion in FIG. 2) of the housing 12. The internal space of the cylindrical portion 12a functions as a clutch accommodating space. The straight spline fitting portion 120a is formed in the inner periphery of the cylindrical portion 12a. The straight spline fitting portion 120a is fitted to the straight spline fitting portions 81a of the outer clutch plates 81 and the straight spline fitting portion 11a of the pressing member 11. As shown in FIG. 3, the cylindrical portion 12a has through-holes 122a. Each through-hole 122a is located between any adjacent two spline teeth among spline teeth 121a of the straight spline fitting portion 120a, and has an axis L that is perpendicular to the axis (rotation axis O) of the housing 12.

The shaft portion 12b is arranged at the other-side end portion (left-side end portion in FIG. 2) of the housing 12. The shaft portion 12b is coupled to the side gear 214R through spline-fitting by inserting its distal end portion into the opening portion of the side gear 214R. Thus, the shaft portion 12b is connected to the side gear 214R so as to be non-rotatable but movable relative to the side gear 214R. The shaft portion 12b has a recessed hole 120b that communicates with the inside of the cylindrical portion 12a.

The inner shaft 13 has cylindrical portions 13a to 13c (13b is a shaft portion) and step faces 13d, 13e. The inner shaft 13 is arranged on the rotation axis O of the housing 12, and the entirety of the inner shaft 13 is formed of a closed-end cylindrical member that is open toward one side (right side in FIG. 2) in the axial direction. The outside diameters of the cylindrical portions 13a to 13c are set to sizes different from one another. The outside diameter of the cylindrical portion 13a is set to the maximum size (maximum outside diameter). The outside diameter of the shaft portion 13b is set to the minimum size (minimum outside diameter). The outside diameter of the cylindrical portion 13c is set to a size (intermediate outside diameter) in between the outside diameter of the cylindrical portion 13a and the outside diameter of the shaft portion 13b. The distal end portion of the rear wheel axle shaft 213R (shown in FIG. 1) is inserted and accommodated in the opening portion of the inner shaft 13. The rear wheel axle shaft 213R is coupled to the inner shaft 13 through spline-fitting so as to be non-rotatable but movable relative to the inner shaft 13.

The cylindrical portion 13a having the maximum outside diameter is located at the axially center portion of the inner shaft 13, at a position between the shaft portion 13b having the minimum outside diameter and the cylindrical portion 13c having the intermediate outside diameter. The cylindrical portion 13a having the maximum outside diameter is rotatably supported by the bottom portion of the cylindrical portion 12a of the housing 12 via a spacer 23 and a needle roller bearing 24 arranged on the step face 13d, and is rotatably supported by the flange end face of the inner flange 412a of the case 41 via a spacer 25 and a needle roller bearing 26 arranged on the step face 13e. The straight spline fitting portion 130a is formed in the outer periphery of the cylindrical portion 13a having the maximum outside diameter. The straight spline fitting portion 130a is exposed to the inside of the cylindrical portion 12a of the housing 12, and is fitted to the straight spline fitting portions 80a of the inner clutch plates 80 of the clutch 8.

The shaft portion 13b having the minimum outside diameter is arranged at one side (left side in FIG. 2) of the inner shaft 13, and is rotatably supported in the recessed hole 120b of the housing 12 via a needle roller bearing 27.

The cylindrical portion 13c having the intermediate outside diameter is arranged at the other side (right side in FIG. 2) of the inner shaft 13. The cylindrical portion 13c having the intermediate outside diameter is rotatably supported by the inner periphery of the cylindrical portion 410a of the case 41 via the needle roller bearing 53.

The step face 13d is located between the cylindrical portions 13a, 13b. The step face 13e is located between the cylindrical portions 13a, 13c.

As shown in FIG. 2, the pressing force application mechanism 15 includes the piston 150 and pressure regulation valves 151, and is accommodated in the apparatus case 4 (case 41). In the pressing force application mechanism 15, the piston 150 moves toward the clutch 8 upon reception of the hydraulic pressure of lubricating oil on the space 42a side, and applies the pressing force (the first pressing force P1 and the second pressing force P2) to the clutch 8.

The piston 150 has annular portions 150a to 150c. The piston 150 is interposed between the piston 150-side end face of the pressing member 11 and the bottom face of the case 41 so as to move back and forth. The entirety of the piston 150 is formed of an annular member through which the cylindrical portion 410a is passed. The piston 150 applies, to the clutch 8, the first pressing force P1 for reducing the clearance between adjacent clutch plates prior to an opening operation of the pressure regulation valve 151 and the second pressing force P2 for frictionally engaging the clutch plates with each other. The first pressing force P1 and the second pressing force P2 each are larger than the spring force a of the return spring 49 (a<P1≤P2).

The outside diameters of the annular portions 150a to 150c are set to sizes different from one another. The outside diameter of the annular portion 150a is set to the maximum outside diameter. The outside diameter of the annular portion 150b is set to the minimum outside diameter. The outside diameter of the annular portion 150c is set to the intermediate outside diameter in between the outside diameter of the annular portion 150a and the outside diameter of the annular portion 150b.

The annular portion 150a having the maximum outside diameter is arranged at axial one side (right side in FIG. 2) of the piston 150. A seal member 57 and a seal member 58 are attached to the annular portion 150a having the maximum outside diameter. The seal member 57 is interposed between the outer periphery of the annular portion 150a and the inner periphery of the case 41. The seal member 58 is interposed between the inner periphery of the annular portion 150a and the outer periphery of the cylindrical portion 410a. The clutch 8-side end face of the annular portion 150a having the maximum outside diameter is formed of a spring receiving face 150d that faces the spring receiving face 400a of the case 40 via the return spring 49.

The annular portion 150b having the minimum outside diameter is passed through the pressing member 11 and faces the clutch 8 (the piston 150-side end face of the inner clutch plate 80), and is arranged at an axial other side (left side in FIG. 2) of the piston 150.

The annular portion 150c having the intermediate outside diameter faces the piston 150-side end face of the pressing member 11 via the needle roller bearing 44, and is arranged at the axial center portion of the piston 150. The outer periphery of the annular portion 150c having the intermediate outside diameter is tapered such that the outside diameter gradually decreases from the annular portion 150a having the maximum outside diameter toward the annular portion 150b having the minimum outside diameter.

The piston 150 has a plurality of (for example, six in the present embodiment) oil inlet portions 47 that is arranged at equal intervals around the rotation axis O.

Each of the oil inlet portions 47 has two holes 47a, 47b (large hole 47a, small hole 47b) having hole diameters different from each other and an annular seat face 47c located between both holes 47a, 47b. Each of the oil inlet portions 47 is an oil flow passage formed of a through-hole (round hole) that extends from the annular portion 150a having the maximum outside diameter to the annular portion 150b having the minimum outside diameter. The oil introducing capacity of the oil inlet portions 47 is larger than the oil delivery capacity of the oil outlet portion 48. That is, an introducing rate Q1 of the lubricating oil that is introduced from the space 42a to the space 42b via the oil inlet portions 47 is set to a flow rate higher than a delivery rate Q2 (Q2<Q1) of the lubricating oil that is delivered from the space 42b to the outside (oil tank 43) via the oil outlet portion 48. The flow rate difference (Q1−Q2) is created by, for example, setting the opening area of the oil inlet portions 47 to an area smaller than the opening area of the oil outlet portion 48.

Therefore, while the four-wheel-drive vehicle 200 (shown in FIG. 1) travels in the four-wheel-drive mode, the lubricating oil supplied to the space 42a after opening the oil inlet portions 47 flows through the oil inlet portions 47 into the space 42b, and then part of the lubricating oil flows from the space 42b through the oil outlet portion 48 to the outside. However, a predetermined amount of lubricating oil is ensured in the space 42b. While the four-wheel-drive vehicle 200 travels in the two-wheel-drive mode, the lubricating oil flows from the space 42b through the oil outlet portion 48 to the outside (oil tank 43). Therefore, it is possible to avoid the situation where the amount of lubricating oil in the space 42b, that is, the clutch-side space, is excessively small while the four-wheel-drive vehicle 200 travels in the four-wheel-drive mode, and it is possible to avoid the situation where the amount of lubricating oil in the clutch-side space becomes an amount, at which drag torque is generated, while the four-wheel-drive vehicle 200 travels in the two-wheel-drive mode.

The pressure regulation valve 151 is arranged in each of the oil inlet portions 47. The pressure regulation valve 151 opens or closes upon reception of hydraulic pressure of the lubricating oil that is supplied to the space 42a of the apparatus case 4.

Each pressure regulation valve 151 is arranged in the large hole 47a of a corresponding one of the oil inlet portions 47. Each pressure regulation valve 151 enters an open state upon reception of a hydraulic pressure higher than or equal to a predetermined pressure P3 (P3>P2). That is, in an open state of the pressure regulation valves 151, the oil inlet portions 47 are open. When a hydraulic pressure lower than the predetermined pressure is applied, the pressure regulation valves 151 do not enter an open state and are kept in a closed state. That is, in a closed state of the pressure regulation valves 151, the oil inlet portions 47 are closed. Therefore, when the piston 150 receives a hydraulic pressure corresponding to the first pressing force P1 from lubricating oil, the piston 150 moves toward the clutch 8 while not opening the oil inlet portions 47, and applies the first pressing force P1 to the clutch 8 together with the pressing member 11. After that, when the piston 150 receives a hydraulic pressure corresponding to the second pressing force P2 from lubricating oil, the piston 150 moves toward the clutch 8 while not opening the oil inlet portions 47, and applies the second pressing force P2 to the clutch 8 together with the pressing member 11. Each pressure regulation valve 151 is, for example, a relief valve that includes a valve element 152 and a spring 153. The valve element 152 opens and closes the oil inlet portion 47, and is able to be seated on the seat face 47c. The spring 153 applies, to the valve element 152, spring force in a direction in which the oil inlet portion 47 is closed.

Next, the operation of the driving force transmission apparatus according to the present embodiment will be described with reference to FIG. 1 and FIG. 2.

In FIG. 1, when the four-wheel-drive vehicle 200 is in the two-wheel-drive mode, the rotational driving force of the engine 202 is transmitted to the front differential 206 via the transmission 203. The rotational driving force of the engine 202 is transmitted from the front differential 206 to the front wheels 204R, 204L via the front wheel axle shafts 208R, 208L, and the front wheels 204R, 204L are rotated.

In this case, in FIG. 2 (upper half), the pump 418 is in a non-driven state. Therefore, the pressing force application mechanism 15 is not actuated.

Therefore, the second pressing force P2 that is the clutch actuating force is not applied from the piston 150 of the pressing force application mechanism 15 to the clutch 8 via the pressing member 11, the inner clutch plates 80 and the outer clutch plates 81 of the clutch 8 do not frictionally engage with each other, and the rotational driving force of the engine 202 is not transmitted from the housing 12 to the inner shaft 13. In this case, in the apparatus case 4, the lubricating oil in the space 42b, that is, the clutch-side space, is delivered to the oil tank 43 via the oil outlet portion 48. Therefore, occurrence of drag torque based on the viscosity of lubricating oil between the inner clutch plates 80 and outer clutch plates 81 of the clutch 8 is suppressed.

On the other hand, in order to shift the four-wheel-drive vehicle 200 from the two-wheel-drive mode into the four-wheel-drive mode, the propeller shaft 2 is coupled to the rear wheel axle shaft 213L by the driving force transmission apparatus 1 such that torque is transmittable therebetween, and then the front differential case 212 is coupled to the propeller shaft 2 by the driving force interrupting device 3 such that torque is transmittable therebetween.

When the propeller shaft 2 is coupled to the rear wheel axle shaft 213R, the pump 418 is driven by the driving source 419 in the forward direction to supply the lubricating oil in the oil tank 43 to the space 42a of the apparatus case 4. In this case, when the pump 418 is driven, the lubricating oil in the oil tank 43 flows through the oil flow passage 417 into the piping portion 413a, and then flows through the piping portion 413a into the space 42a.

Therefore, the piston 150 receives hydraulic pressure from the lubricating oil in an initial state shown in FIG. 2 (upper half), and the pressing force application mechanism 15 is actuated. In this case, when the pressing force application mechanism 15 is actuated, the piston 150 moves toward the clutch 8 in the space 42a and the space 42b in a state where the oil inlet portions 47 are closed, and applies the first pressing force P1 to the pressing member 11.

Accordingly, the pressing member 11 moves together with the piston 150 toward the clutch 8 in the space 42b against the spring force of the return spring 49, and moves the entirety of the clutch 8 to bring the clutch 8 into contact with the bottom portion of the housing 12.

Thus, the clearance C between any adjacent two clutch plates among the inner clutch plates 80 and the outer clutch plates 81 becomes, for example, 0 (C=0).

Next, the pump 418 is driven by the driving source 419 in the forward direction, and the lubricating oil in the oil tank 43 is supplied to the space 42a. In this case, when the lubricating oil is supplied to the space 42a, the piston 150 receives a hydraulic pressure higher than the pressure corresponding to the first pressing force P1 from lubricating oil, moves in the space 42a and the space 42b against the spring force of the return spring 49 while not opening the oil inlet portions 47, and applies the second pressing force P2 to the pressing member 11.

Accordingly, when the pressing member 11 receives the second pressing force P2, the pressing member 11 moves together with the piston 150 in the space 42b toward the clutch 8 against the spring force of the return spring 49 to cause the entirety of the clutch 8 to be further pressed against the bottom portion of the housing 12 and moved. At this time, when the piston 150 receives a hydraulic pressure higher than the second pressing force P2 from the lubricating oil, the pressure regulation valves 151 are brought into an open state, and the lubricating oil is introduced from the space 42a to the space 42b via the oil inlet portions 47. In this case, the lubricating oil in the space 42b is delivered to the oil tank 43 via the oil outlet portion 48. However, because the introducing rate Q1 of lubricating oil is higher than the delivery rate Q2 of lubricating oil, it is possible to avoid the situation where the amount of lubricating oil in the space 42b is excessively small.

Thus, any adjacent two clutch plates among the inner clutch plates 80 and the outer clutch plates 81 frictionally engage with each other, and the housing 12 and the inner shaft 13 are coupled to each other via the clutch 8.

Therefore, the rotational driving force of the engine 202 is transmitted from the housing 12 to the inner shaft 13, and further transmitted from the inner shaft 13 to the rear wheel 205R via the rear wheel axle shaft 213R. Thus, the rear wheel 205R is rotated.

The propeller shaft 2 and the rear wheel axle shaft 213L are coupled to each other without providing the driving force transmission apparatus 1 therebetween. Therefore, the rotational driving force of the engine 202 is transmitted from the propeller shaft 2 to the rear wheel 205L via the rear wheel axle shaft 213L while the front differential case 212 is coupled to the propeller shaft 2, and the rear wheel 205L is rotated.

In order to disconnect the propeller shaft 2 and the rear wheel axle shaft 213R from each other, the pump 418 is driven by the driving source 419 in the reverse direction, and the lubricating oil in the space 42a is returned to the oil tank 43. In this case, when the pump 418 is driven, the lubricating oil in the space 42a flows out to the piping portion 413a, and flows out from the piping portion 413a through the oil flow passage 417 to the oil tank 43. In addition, the lubricating oil in the space 42b flows through the oil outlet portion 48 to the oil tank 43.

According to the above-described first embodiment, the following advantageous effects are obtained.

(1) It is possible to keep the oil level of the lubricating oil in the apparatus case 4 (space 42b) at a desired oil level when the four-wheel-drive vehicle 200 travels in the four-wheel-drive mode and in the two-wheel-drive mode. Therefore, it is possible to reduce drag torque, and it is possible to suppress a decrease in the durability of the clutch 8. In this case, connection of the housing 12 with the inner shaft 13 is achieved by applying the first pressing force P1 and the second pressing force P2 to the clutch 8. Therefore, it is possible to increase the clearance between the clutch plates of the clutch 8, and it is possible to further improve the effect of reducing drag torque.

(2) The piston 150 is returned to the initial position by the return spring 49. Therefore, it is possible to drain the lubricating oil to the outside of the apparatus case 4 with the use of the piston 150, and it is possible to smoothly return the lubricating oil to the oil tank 43.

(3) After the lubricating oil is supplied from the oil tank 43 to the space 42a by driving the pump 418, a hydraulic circuit that introduces the lubricating oil from the space 42a to the space 42b via the oil inlet portions 47 and then delivers the lubricating oil to the oil tank 43 via the oil outlet portion 48 is formed, and the lubricating oil smoothly flows in the hydraulic circuit.

(4) The upper limit height of the oil level of the lubricating oil in the space 42b is determined by the first oil flow hole 401c. Therefore, the oil level of the lubricating oil in the space 42b does not become an oil level higher than the upper limit height. Therefore, it is possible to avoid the situation where an excessive amount of lubricating oil is stored in the space 42*b*.

(5) The oil inlet portions 47 are formed in the piston 15. Therefore, the oil inlet portions 47 are arranged inside the apparatus case 4, and, as a result, it is possible to reduce the size of the apparatus as a whole as compared to the case where the oil inlet portions 47 are arranged outside of the apparatus case 4.

Figure 4:
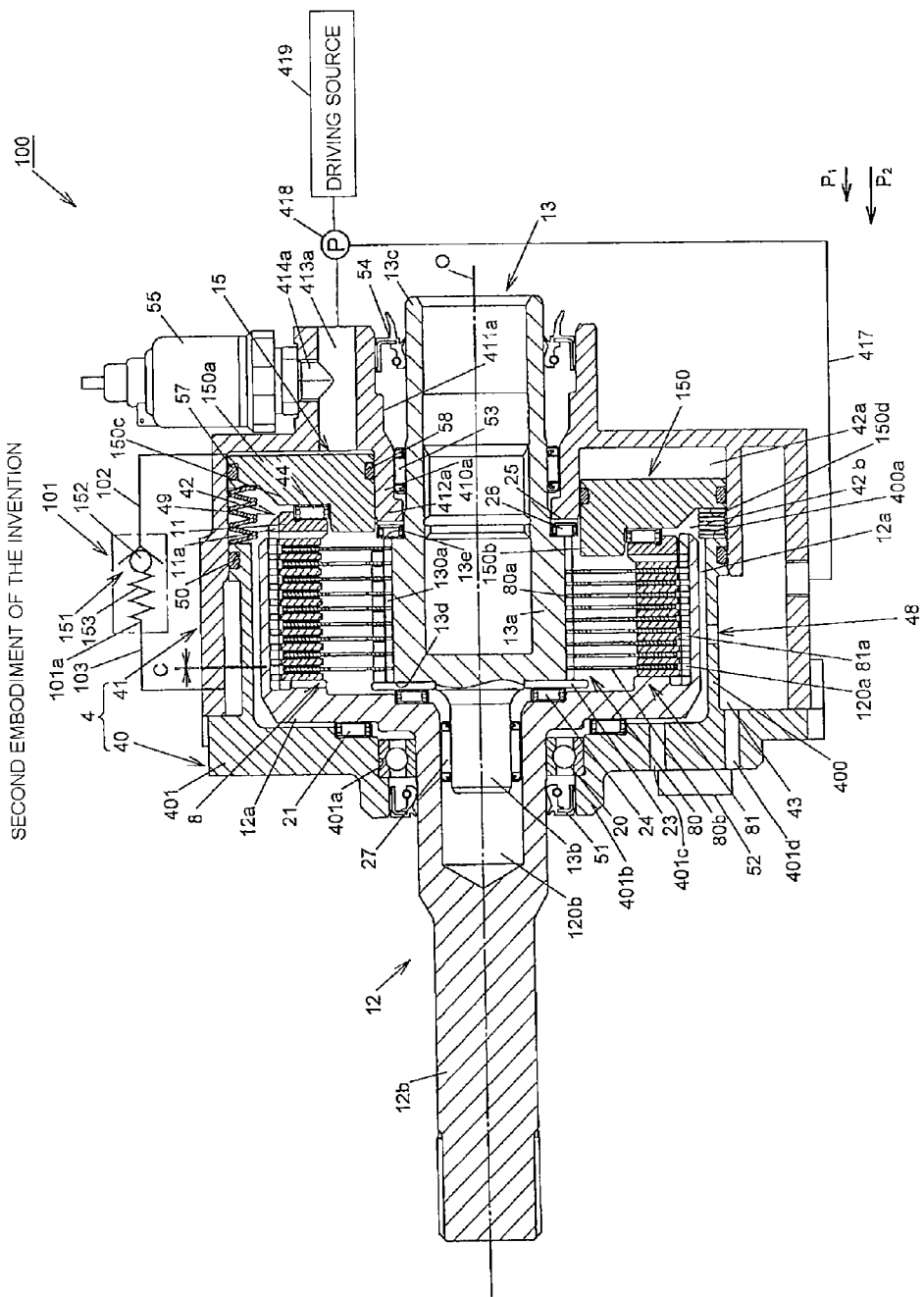
FIG. 4 is a sectional view for illustrating the entirety of a driving force transmission apparatus according to a second embodiment of the invention, wherein the upper half shows a disconnected state and the lower half shows a connected state.

Next, a driving force transmission apparatus 100 according to a second embodiment of the invention will be described with reference to FIG. 4. FIG. 4 shows the driving force transmission apparatus. In FIG. 4, the components having the same or equivalent functions to those in FIG. 2 are denoted by the same reference numerals as those in FIG. 2, and the detailed description is omitted.

As shown in FIG. 4, the driving force transmission apparatus 100 according to the second embodiment of the invention differs from the driving force transmission apparatus 1 according to the first embodiment in that, instead of the oil inlet portions 47 arranged inside the apparatus case 4, an oil inlet portion 101 is arranged outside of the apparatus case 4 (outside of the oil supply-side space 42*a* and the clutch-side space 42*b*).

Therefore, the oil inlet portion 101 has an oil flow passage 101*a*. One end portion of the oil flow passage 101*a* is connected to the space 42*a* via a pipe 102, and the other end portion of the oil flow passage 101*a* is connected to the space 42*b* via a pipe 103. The oil introducing capacity of the oil inlet portion 101 is higher than the oil delivery capacity of the oil outlet portion 48 as in the case of the first embodiment.

The pressure regulation valve 151 is arranged in the oil inlet portion 101. The pressure regulation valve 151 opens or closes upon reception of hydraulic pressure of the lubricating oil that is supplied to the space 42*a* of the apparatus case 4.

In the thus configured driving force transmission apparatus 100, while the four-wheel-drive vehicle 200 (shown in FIG. 1) travels in the four-wheel-drive mode, the lubricating oil supplied to the space 42*a* after opening the oil inlet portion 101 flows through the oil inlet portion 101 into the space 42*b*, and then part of the lubricating oil flows from the space 42*b* through the oil outlet portion 48 to the outside. However, a predetermined amount of lubricating oil is kept in the space 42*b*. While the four-wheel-drive vehicle 200 travels in the two-wheel-drive mode, the lubricating oil in the space 42*b* flows through the oil outlet portion 48 to the outside (oil tank 43). Therefore, it is possible to avoid the situation where the amount of lubricating oil in the space 42*b*, that is, the clutch-side space is excessively small while the four-wheel-drive vehicle 200 travels in the four-wheel-drive mode, and it is possible to avoid the situation where the amount of lubricating oil in the clutch-side space becomes an amount, at which drag torque is generated, while the four-wheel-drive vehicle 200 travels in the two-wheel-drive mode.

According to the above-described second embodiment, the following advantageous effects are obtained in addition to the advantageous effects (1) to (4) of the first embodiment.

The oil inlet portion 101 is arranged outside of the apparatus case 4. Therefore, it is not necessary to employ the configuration employed in the first embodiment (configuration that the oil inlet portions are provided in the piston 150). Thus, the shape of the piston 150 is not complex, and it is possible to easily form the piston 150.

The driving force transmission apparatus according to the invention is described on the basis of the above embodiments. However, the invention is not limited to the above embodiments. It is possible to implement the invention in various other embodiments without departing from the scope of the invention. For example, the following modifications may be made.

(1) In the above-described embodiments, the description is made on the case where the first pressing force P1 for reducing the clearance C between any adjacent inner clutch plate 80 and outer clutch plate 81 to, for example, 0 (C=0) is applied to the piston 150 by the pressing force application mechanism 15. However, the invention is not limited to this configuration. The first pressing force P1 for reducing the clearance between any adjacent clutch plates of the clutch 8 as compared to that in the initial state may be applied to the piston 150 by actuating the pressing force application mechanism 15. That is, in short, the invention just needs to be configured such that the pressing force application mechanism applies, to the piston, the first pressing force for reducing the clutch plate clearance of the clutch.

(2) In the above-described embodiments, the description is made on the case where the housing 12 is coupled to the input shaft side and the inner shaft 13 is coupled to the output shaft side. However, the invention is not limited to this configuration. Similar advantageous effects are obtained when the housing is coupled to the output shaft side and the inner shaft is coupled to the input shaft side.

According to the invention, it is possible to keep the oil level of lubricating oil in the apparatus case at a desired oil level height during application of pressing force. Therefore, it is possible to suppress a decrease in the durability of the clutch. Oil is drained to the tank through the oil outlet portion of the apparatus case when pressing force is not required, and oil in the clutch space decreases. Therefore, it is possible to reduce drag torque.

What is claimed is:

1. A driving force transmission apparatus, comprising:
   a first rotary member that is rotated by a driving source of a vehicle;
   a second rotary member that is arranged on a rotation axis of the first rotary member so as to be rotatable relative to the first rotary member;
   a clutch that is interposed between the second rotary member and the first rotary member, and that couples the first rotary member and the second rotary member to each other such that the first rotary member and the second rotary member are disengageable from each other;
   a pressing force application mechanism that includes a piston that applies pressing force to the clutch through movement due to supplied hydraulic fluid; and
   an apparatus case that has two spaces that are adjacent to each other via the piston of the pressing force application mechanism, wherein
   an oil inlet portion for introducing the hydraulic fluid from an oil supply-side space among the two spaces to a clutch-side among the two spaces is formed,
   the apparatus case has an oil outlet portion for delivering the hydraulic fluid from the clutch-side space to an outside of the clutch-side space with an oil delivery capacity lower than an oil introducing capacity of the oil inlet portion, and
   a pressure regulation valve that brings the oil inlet portion into an open state upon reception of a hydraulic pressure higher than or equal to a predetermined pressure from the hydraulic fluid is arranged at the oil inlet portion.

2. The driving force transmission apparatus according to claim 1, wherein:
   the oil inlet portion has an oil flow passage and the oil outlet portion has an oil flow passage; and an opening area of the oil flow passage of the oil inlet portion is set larger than an opening area of the oil flow passage of the oil outlet portion.

3. The driving force transmission apparatus according to claim 1, wherein the piston of the pressing force application mechanism applies, to the clutch, a first pressing force for reducing a clutch plate clearance prior to an opening operation of the pressure regulation valve as the pressing force and a second pressing force for frictionally engaging clutch plates with each other as the pressing force.

4. The driving force transmission apparatus according to claim 2, wherein the piston of the pressing force application mechanism applies, to the clutch, a first pressing force for reducing a clutch plate clearance prior to an opening operation of the pressure regulation valve as the pressing force and a second pressing force for frictionally engaging clutch plates with each other as the pressing force.

5. The driving force transmission apparatus according to claim 1, wherein the apparatus case incorporates therein a return spring having spring force for returning the piston to an initial position, and the spring force of the return spring is smaller than the pressing force.

6. The driving force transmission apparatus according to claim 2, wherein the apparatus case incorporates therein a return spring having spring force for returning the piston to an initial position, and the spring force of the return spring is smaller than the pressing force.

7. The driving force transmission apparatus according to claim 3, wherein the apparatus case incorporates therein a return spring having spring force for returning the piston to an initial position, and the spring force of the return spring is smaller than each of the pressing forces.

8. The driving force transmission apparatus according to claims 4, wherein the apparatus case incorporates therein a return spring having spring force for returning the piston to an initial position, and the spring force of the return spring is smaller than each of the pressing forces.

9. The driving force transmission apparatus according to claim 1, wherein:
the apparatus case has an oil tank that stores the hydraulic fluid; and
the oil tank is connected to the oil supply-side space via a pump and is connected to the clutch-side space via the oil outlet portion.

10. The driving force transmission apparatus according to claim 2, wherein:
the apparatus case has an oil tank that stores the hydraulic fluid; and
the oil tank is connected to the oil supply-side space via a pump and is connected to the clutch-side space via the oil outlet portion.

11. The driving force transmission apparatus according to claim 3, wherein:
the apparatus case has an oil tank that stores the hydraulic fluid; and
the oil tank is connected to the oil supply-side space via a pump and is connected to the clutch-side space via the oil outlet portion.

12. The driving force transmission apparatus according to claim 4, wherein:
the apparatus case has an oil tank that stores the hydraulic fluid; and
the oil tank is connected to the oil supply-side space via a pump and is connected to the clutch-side space via the oil outlet portion.

13. The driving force transmission apparatus according to claim 9, wherein:
the apparatus case has an oil flow hole for determining an upper limit height of an oil level height of hydraulic fluid in the clutch-side space; and
the oil flow hole is connected to the oil tank via a pipe.

14. The driving force transmission apparatus according to claim 10, wherein:
the apparatus case has an oil flow hole for determining an upper limit height of an oil level height of hydraulic fluid in the clutch-side space; and
the oil flow hole is connected to the oil tank via a pipe.

15. The driving force transmission apparatus according to claim 1, wherein the oil inlet portion is formed in the piston.

16. The driving force transmission apparatus according to claim 2, wherein the oil inlet portion is formed in the piston.

17. The driving force transmission apparatus according to claim 3, wherein the oil inlet portion is formed in the piston.

18. The driving force transmission apparatus according to claim 1, wherein the oil inlet portion is arranged outside of the oil supply-side space and the clutch-side space.

19. The driving force transmission apparatus according to claim 2, wherein the oil inlet portion is arranged outside of the oil supply-side space and the clutch-side space.

20. The driving force transmission apparatus according to claim 3, wherein the oil inlet portion is arranged outside of the oil supply-side space and the clutch-side space.

* * * * *